J. R. FULTON.
Stove-Pipe Thimbles.
No. 142,784. Patented September 16, 1873.
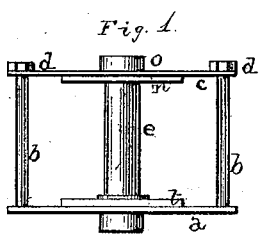
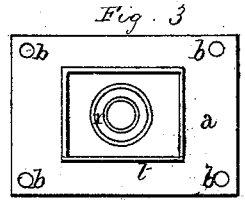
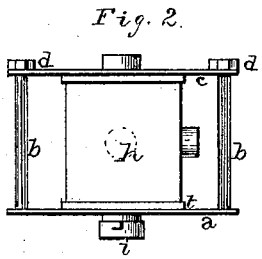
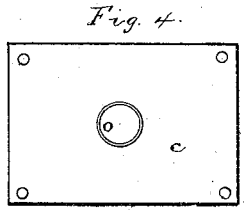
WITNESSES.
INVENTOR.

UNITED STATES PATENT OFFICE.

JOHN R. FULTON, OF WEST MAHONING TOWNSHIP, INDIANA COUNTY, PA.

IMPROVEMENT IN STOVE-PIPE THIMBLES.

Specification forming part of Letters Patent No. 142,784, dated September 16, 1873; application filed December 19, 1872.

*To all whom it may concern:*

Be it known that I, JOHN R. FULTON, of West Mahoning township, county of Indiana and State of Pennsylvania, have invented certain new and useful Improvements in Flues, of which the following is a specification:

The nature of my invention relates to an improvement in stove-pipe thimbles for conducting the pipes up through the floors from one story to another; and consists in two plates bound together by means of bolts, and having flanges on their inner surfaces for the reception of two pipes, the smaller of which is to be used when the pipe extends vertically upward, and may be secured in place by cement or other material, while the other is used when the pipe comes from the side, or it may be used to form an air-chamber for the smaller one.

Figure 1 represents a side elevation of my invention; Fig. 2, section of a modification of the same; Figs. 3 and 4 are detail views, showing the flanges.

$a$ represents a flat plate, secured in position against the ceiling by the bolts $b$, which pass up into the room above, and are fastened to the plate $c$ by means of the nuts $d$. Upon the top of the plate $a$ are cast two circular flanges, $r$, in which I place a tile or short pipe, $e$, and pack the joint with cement, so as to always keep this pipe in position, so that it will only be necessary to have a pipe long enough to reach up to the pipe $i$ instead of being long enough to reach up into the room above. Should the pipe come from the side instead of below, I take away the short pipe $e$ and substitute the one $h$, which has one or more openings in its sides, and which fits in the square flanges $n\ t$ between the two plates, closing the pipe $i$ below. Should it be desired this large pipe may be used as an air-chamber around the smaller one $e$, so as to protect the adjoining wood-work from any liability to fire. This flue will be made and applied to the ceiling as a permanent fixture, the ascending pipes leading from the stove to be secured upon the short pipes or flanges $i\ o$ whenever it may be desired to use it.

Having thus described my invention, what I claim as new, and desire to secure by Letters Patent, is—

As a new article of manufacture, a thimble-connection consisting of the plates $a\ c$, secured together by the bolts $b$, and provided with the flanges $n\ t\ r$ for the reception of the pipes $e\ h$, substantially as shown and described.

In testimony that I claim the foregoing as my invention I hereunto affix my signature this 18th day of December, 1872.

JOHN R. FULTON.

Witnesses:
 EDM. F. BROWN,
 W. K. DUHAMEL.